Figure 1:
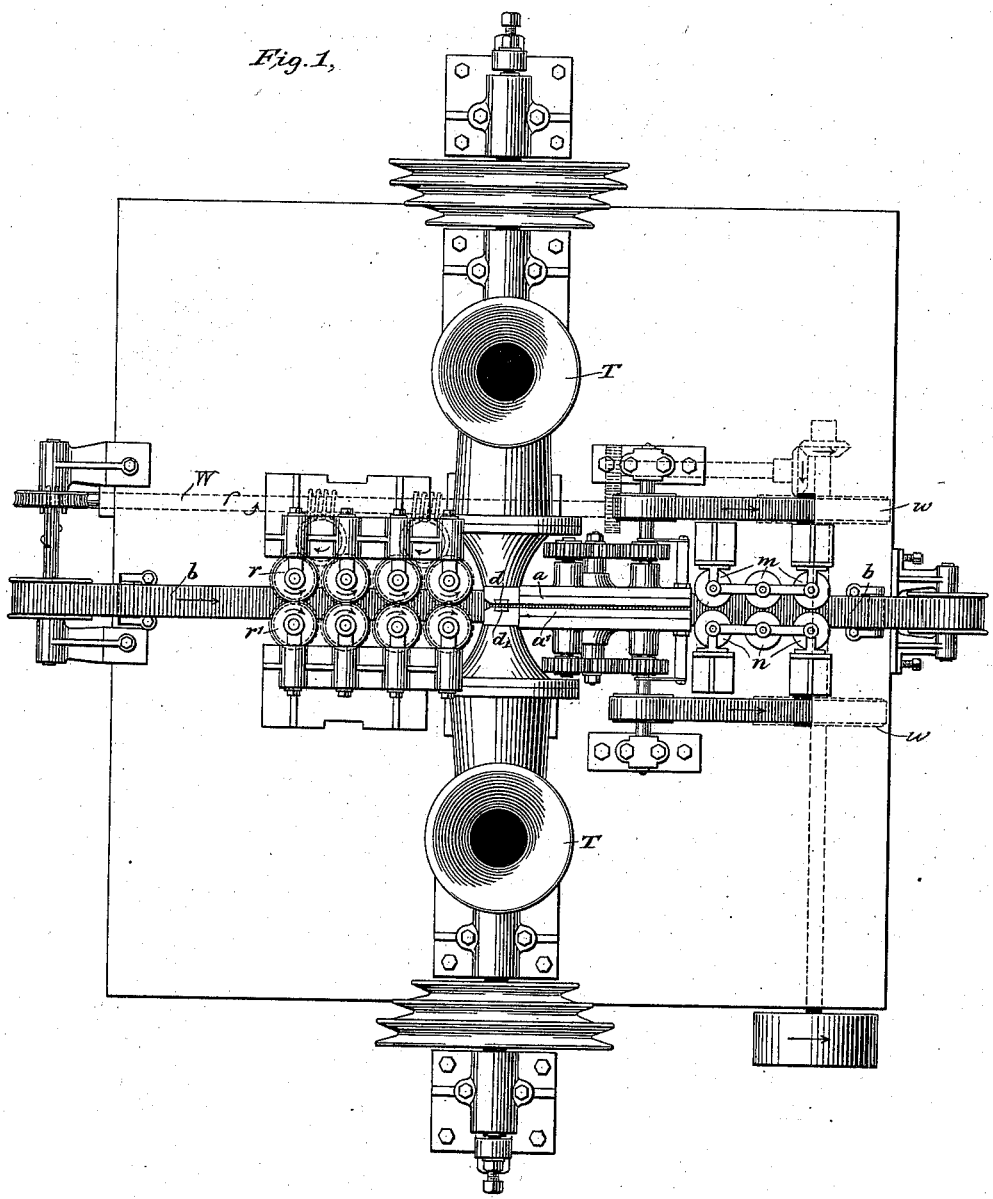

(No Model.) 5 Sheets—Sheet 1.

A. F. MADDEN.
APPARATUS FOR PREPARING SECONDARY BATTERY PLATES.

No. 382,098. Patented May 1, 1888.

Fig. 1,

Witnesses
Geo. W. Breck.
Edward Thorpe

Inventor,
Albert Franklin Madden.
By his Attorney Wm B Vansize (No Model.) 5 Sheets—Sheet 2.

A. F. MADDEN.
APPARATUS FOR PREPARING SECONDARY BATTERY PLATES.

No. 382,098. Patented May 1, 1888.

Witnesses
Geo. W. Breck.
Edward Thorpe.

Inventor.
Albert Franklin Madden
By his Attorney Wm. B. Vansize

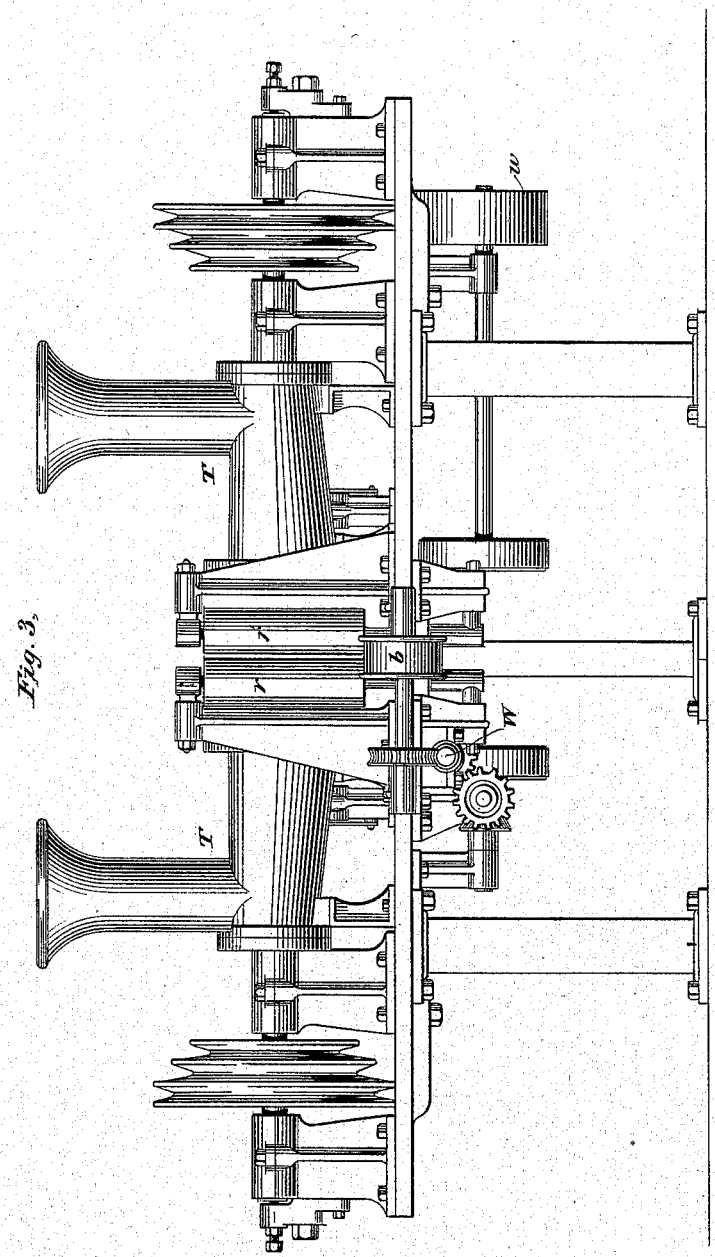

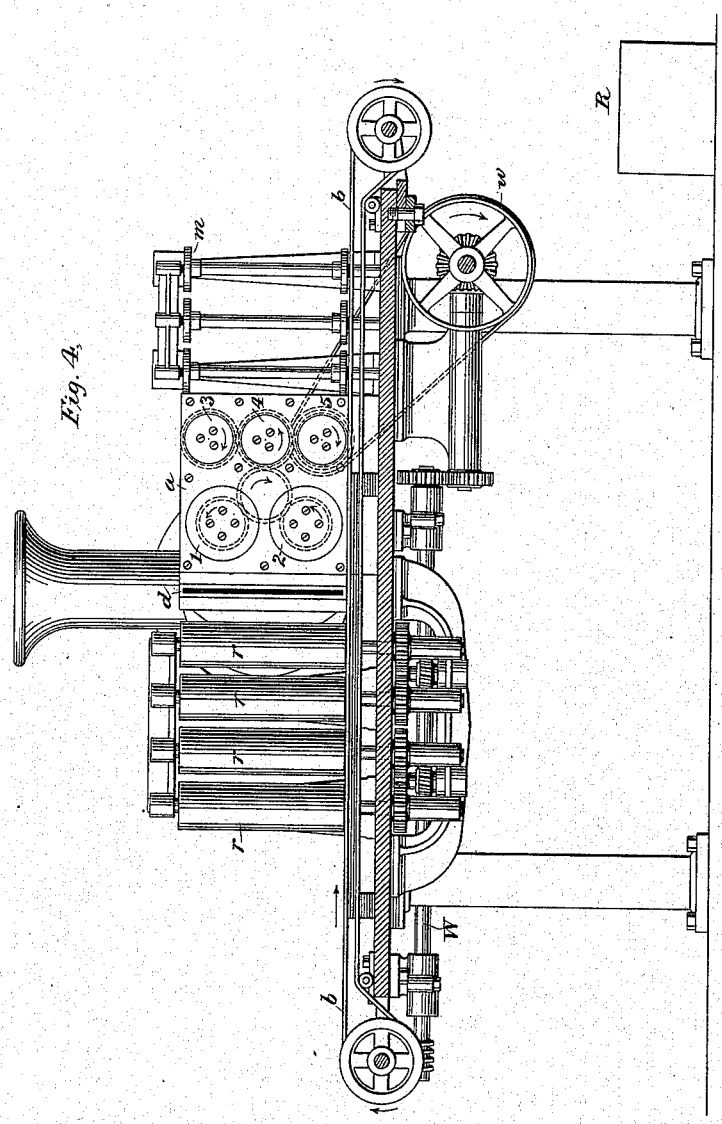

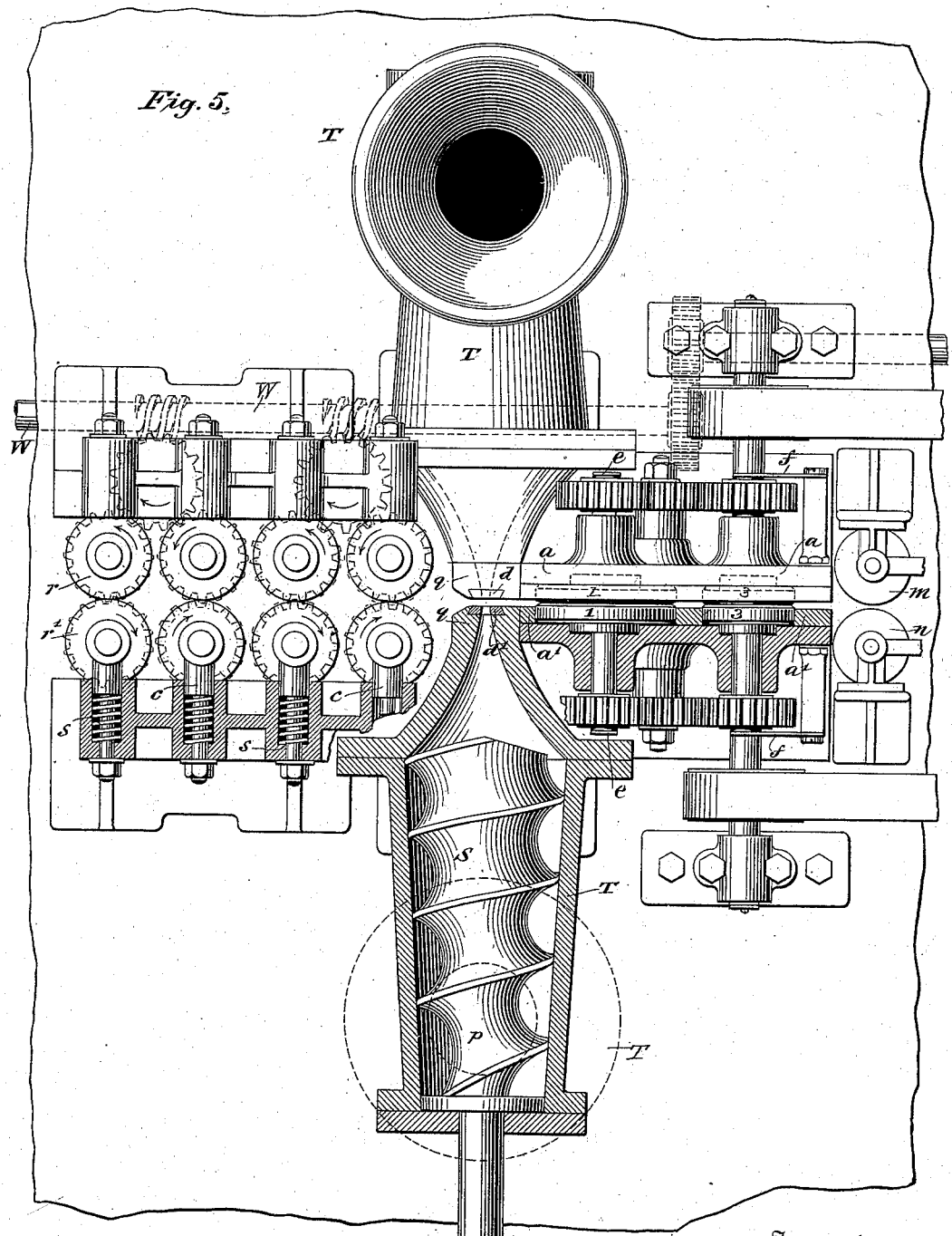

UNITED STATES PATENT OFFICE.

ALBERT FRANKLIN MADDEN, OF NEWARK, NEW JERSEY, ASSIGNOR TO THE ELECTRICAL ACCUMULATOR COMPANY, OF NEW YORK.

APPARATUS FOR PREPARING SECONDARY-BATTERY PLATES.

SPECIFICATION forming part of Letters Patent No. 382,098, dated May 1, 1888.

Application filed September 20, 1887. Serial No. 250,166. (No model.)

*To all whom it may concern:*

Be it known that I, ALBERT FRANKLIN MADDEN, a citizen of the United States, and a resident of Newark, in the county of Essex and State of New Jersey, have invented certain new and useful Improvements in Apparatus for Preparing Secondary-Battery Elements, of which the following is a specification.

My invention relates to an improved apparatus or machinery for preparing plates or elements for use in secondary batteries, the apparatus or machinery being highly useful in the application of any material in the form of a paste or powder, or in a finely-divided state, to a mold or form.

The machine or apparatus is adapted for applying a paste to a mold or form in the shape of a plate having a number of holes, cells, grooves, shelves, or perforations, so that the paste will completely and uniformly fill the said cells or perforations, and the surfaces of the pasted plate will present a smooth, even, and finished appearance.

The invention is specially applicable for use in the manufacture of the plates or elements of secondary batteries, in which a paste consisting of an oxide of lead and dilute sulphuric acid is applied to a lead plate having a series of holes or perforations. In the use of elements of this description the best results are obtained when the holes or perforations are uniformly distributed, and when the paste in each and every perforation is the same in amount, in density, and in all other respects, the object being to secure uniform chemical action at all points of the surface. This result cannot be certainly attained by handwork. To attain this result and to expedite the process of manufacture, as well as to decrease the cost thereof, is the object of this invention.

The machine has the following functions: imparting to the plate a uniform progressive movement; preparing the paste for application by imparting to it the proper density; applying the paste so prepared to the perforated plate coincidently from opposite sides; smoothing the surface of the pasted plate; conveying the surplus material thrown down in the process of smoothing and depositing it in an appropriate receptacle. The machine is susceptible of adjustment to paste plates of any size and to impart any rate of motion to the plates or the feed device, whereby the quantity of material applied is regulated, and it embraces several useful and important details of construction.

A plate, mold, or form of lead or any suitable material, containing numerous small uniformly-distributed holes or perforations, is placed between two series of vertical rollers which support it, while it rests upon a belt or carrier moving with the same speed, which imparts a progressive movement, passing it between two die plates or slots located in the same plane, but upon opposite sides.

The material to be applied thereto in the form of a paste is placed in tubes or passages upon opposite sides of the vertical plate. Each passage is provided with an appropriate flaring mouth or hopper. Within these passages, upon opposite sides of the plate, are continuously-moving feed-screws, the thread on the outer end being of greater pitch than that on the inner end, so that as the screw revolves that portion of the paste in contact with that portion of the screw having the greater pitch will be carried forward more rapidly than the portion of paste immediately in front. The result is a thorough mixing and a packing or accumulation of the paste in the succeeding threads of the screw and in the portion of the passage nearest to the moving plate. The ends of the passages from which the paste emerges to enter the perforated plate are provided with die plates or slots, located as described, and having about the same width as the perforations and in length equal to the vertical height of the plate. These being in the same plane upon opposite sides of the plate, the paste is applied to the plate coincidently from opposite sides, the rate of movement of the plate and the rate of discharge of the paste through the die-plates being so proportioned that any desired quantity of paste can be applied within possible limits. As the plate is carried past the die-plates, its perforations are filled with the paste. Immediately after the advance edge of the plate passes the die-plates it passes between a number of rotating disks divided into two series—one series on each side of the plate. The disks of each series are rapidly revolved in respectively opposite directions in contact with the surface of the pasted plate, so that the surplus material is removed and the surface smoothed and polished. These disks and the plate on which they are located are of a material not acted upon by the liquid used to render the applied material plastic. I prefer to use antimony in the described case. The two series of disks are kept under spring-pressure acting to press them toward each other.

Figure 2:
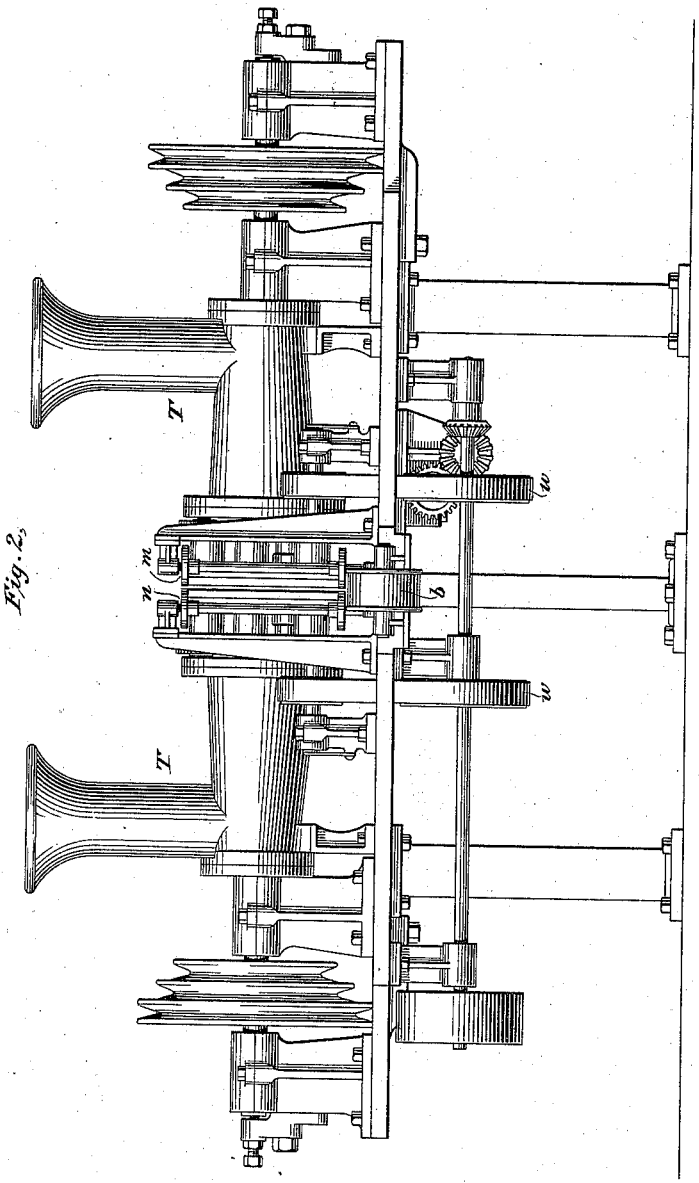

The accompanying drawings illustrate my invention. Figure 1 is a plan view of the machine. Fig. 2 is an end view. Fig. 3 is a transverse section. Fig. 4 is a longitudinal section between the rollers and shows the polishing-disks. Fig. 5 is a detail plan clearly showing the feeding and mixing mechanism.

Referring to Figs. 1 and 5, $r$ indicates a series of four rollers rotated by means of gears connecting with the way-shaft W. These gears may be changed or varied to adjust the speed with which the rollers and also the belt or carrier move.

$r'$ indicates a second series of rollers, each one of this series being geared to a corresponding roller of the first series. The rolls of series $r$ are fixed in bearings. The rolls of series $r'$ are adjustable to and from series $r$, and are normally held in contact by springs $s$, varying the position of adjustable bearings $c$.

$d$ and $d'$ are die-plates, consisting of a strip of metal perforated with a slot, the size and proportions of which are determined by the form of plate to be pasted. In the case of the well-known perforated plate or support used in secondary batteries the length of the slot would be determined by the width of the plate, the width of the slot depending upon the size of the holes or perforations. The strip so formed slides in and out of a fixed support, $q$, which forms a converging mouth-piece or orifice for the tube or passage T. In this tube or passage T the paste designed to be applied to the plates is mixed and prepared for application.

Within the tube T is a feed-screw, S, having a continuous and uniform movement of rotation, the speed of which is adjustable to vary the rate of feed. At its outer end the screw is of greater pitch, $p$, than at the inner end. The paste is introduced at the outer end, and the higher pitch of the thread at this point causes the paste to be carried forward more rapidly than is the case with the paste at or near the inner end of the tube. There is thus produced an accumulation of paste at the inner end, and when the machine is operating the discharge of paste at the die-plates and its rate of accumulation and discharge at the orifice under pressure of the feed-screw are so proportioned as to impart the proper density to the paste, and, further, by the continual rotation of the screw there is a continual disturbance of the paste, and a thorough mixing is thus secured. The rate at which the screw rotates should be so regulated as to supply the paste to the plate designed to be pasted at the proper rate to fill the holes, perforations, or cells, and to properly pack the paste in such holes or receptacles. There is an endless belt, $b$, moving along at the center of the machine under the ends of the rollers. This belt is dragged over a fixed smooth surface furnishing a support. Upon this belt or support the plate rests during its passage through the machine, and any surplus paste cast down during the operation falling upon this belt or carrier is transferred to a receptacle, R, Fig. 4, conveniently located.

There are two feeding-tubes, T, located near the center of the machine. The two series of rollers $r$ and $r'$ are on one side of them, and with the carrier serve to move the plate to be pasted along in front of the dies. After the plate passes the dies it enters between two groups of revolving disks. As here shown, each group consists of five disks—two large and three small—so arranged in two rows that the entire surface of the plate is subjected to the polishing action. I provide two plates, $a$ $a'$, of metal such that there will be no oxidizing or corrosive action due to any substance contained in the paste. I use antimony in this particular case, here used for illustration. These plates are each perforated to receive the series of five disks of the same metal, as 1 2 3 4 5, Fig. 4, each of which disks is located upon an arbor having a longitudinal movement and normally in contact with a corresponding disk similarly arranged upon the opposite side. The springs $e$ and $f$, pressing upon the ends of the respective arbors, hold the disks in contact, as described, and regulate the degree of friction between the rotating disk and the pasted plate. The plates $a$ $a'$ are fixed a certain distance apart. The disks normally make contact, their edges being beveled to admit the edge of the advancing plate, which forces them apart against the pressure of springs $e$ and $f$. The corresponding revolving disks on opposite sides rotate in opposite directions, and successive disks on the same side should rotate in respectively opposite directions. As the pasted plate emerges from the polishing-disks, it passes between two series of idle-rollers having rubber surfaces, $m$ and $n$, which preserve the position of the plate until it is entirely free. The polishing-disks of each series are geared together and are driven from the way-shaft W by means of wheels $w$ and belts, as shown in Fig. 2. Upon the arbors carrying the screws S, which are contained in the tubes or passages T, are cone-pulleys to regulate the speed of rotation, and consequently the rate at which the paste is fed to the plates. The plate, consisting, for instance, of a casting of lead containing numerous holes or perforations to be filled with a paste composed of an oxide of lead and dilute sulphuric acid, is placed in a vertical position upon the belt $b$, its edge introduced between the two series of rollers $r$ and r'. The paste is fed into the hopper of tubes T T, and, being thoroughly mixed and packed by the action of screws S S, emerges under pressure at d d' to enter the perforations of the plate. Passing along between these die-plates, the paste enters the holes coincidently from opposite sides. The pressure is equal and uniform from opposite directions. The movement of the plate is equal and uniform. Consequently paste of the same quantity and density will be applied at all points and to each successive plate. As the pasted plate passes the dies d d', it enters between the two sets or series of revolving disks, which remove the surplus material from both sides, and renders the entire surface of the plate uniformly smooth and polished. The surplus material removed by the revolving disks drops onto the moving belt and is carried to receptacle R. As the plate leaves the polishing-disks, it passes between the idle-rollers m and n, and when entirely free is removed by hand or pushed out by a succeeding plate.

What I claim, and desire to secure by Letters Patent, is—

1. The combination, in a machine for the described purpose, of a moving surface and two or more rolls or cylinders for advancing the mold or form, two tubes or passages opening upon opposite sides of the advancing mold or form, from which the paste emerges to unite therewith, and two series of revolving disks located upon opposite sides of the mold or form, respectively, for smoothing the surfaces thereof.

2. In a machine for the described purpose, the combination of a moving surface and two or more rolls or cylinders for advancing the mold or form, two tubes or passages opening, respectively, upon opposite sides of the advancing mold or form, from which the paste emerges to enter the mold or form coincidently, two series of revolving disks located upon opposite sides of the mold or form, respectively, for smoothing the surfaces thereof, and a series of idle-rollers for supporting the mold or form in position until the operation is completed, all arranged to co-operate substantially as described.

Signed at New York, in the county of New York and State of New York, this 19th day of September, A. D. 1887.

ALBERT FRANKLIN MADDEN.

Witnesses:
 BENJN. T. SQUIER,
 W. H. SHOURDS.